United States Patent [19]
Vrolyk et al.

[11] Patent Number: 4,815,443
[45] Date of Patent: Mar. 28, 1989

[54] SOLAR ENERGY FOCUSING ASSEMBLY AND STORAGE UNIT

[75] Inventors: John J. Vrolyk, Northridge; Charles T. Kudija, Jr., Canyon Country, both of Calif.

[73] Assignee: Rockwell International Corporation, El Segundo, Calif.

[21] Appl. No.: 905,436

[22] Filed: Sep. 10, 1986

[51] Int. Cl.⁴ .................................................. F24J 2/10
[52] U.S. Cl. .................................... 126/438; 126/442
[58] Field of Search ............... 126/440, 430, 432, 435, 126/436, 442, 441, 438, 417, 416, 450

[56] References Cited

U.S. PATENT DOCUMENTS

| | | | |
|---|---|---|---|
| 4,089,325 | 5/1978 | Brola | 126/442 |
| 4,090,498 | 5/1978 | Bensen | 126/438 |
| 4,206,746 | 6/1980 | Chubb | 126/442 |
| 4,212,290 | 7/1980 | Warnken | 126/438 |
| 4,220,140 | 9/1980 | Franua | 126/438 |
| 4,223,174 | 9/1980 | Moeller | 126/425 |
| 4,432,342 | 2/1984 | Lucas et al. | 126/438 |
| 4,462,391 | 7/1984 | Laussermaier et al. | 126/432 |
| 4,528,978 | 7/1985 | Robinson | 126/438 |
| 4,586,487 | 5/1986 | Argood et al. | 126/438 |
| 4,588,151 | 5/1986 | Mori | 244/173 |

Primary Examiner—Randall L. Green
Attorney, Agent, or Firm—H. Fredrick Hamann; Harry B. Field; David C. Faulkner

[57] ABSTRACT

A power system heat source applicable to spacecraft and the like is realized in a combination of an integrated solar absorber-thermal storage assembly 10 and a solar energy focusing unit 50. The focusing unit is capable of selectively functioning inflatable pie-shaped wedges 60 which form a cover for the solar energy focusing unit to control collected radiation effectively and reliably.

6 Claims, 3 Drawing Sheets

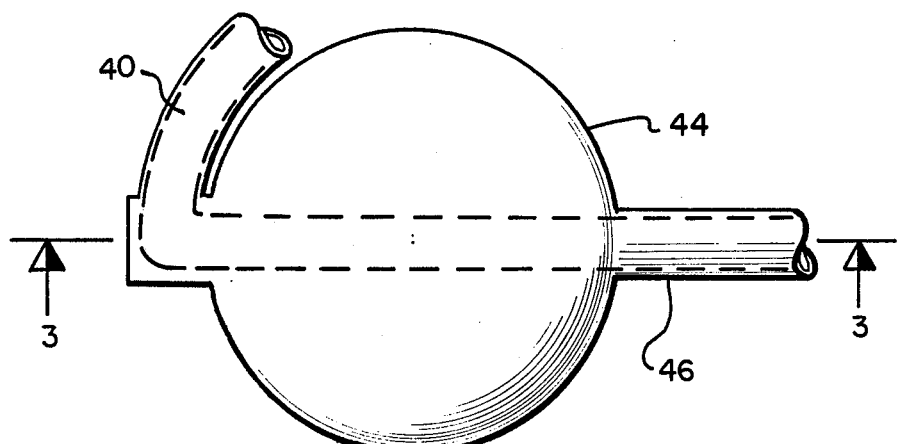
Fig.3.
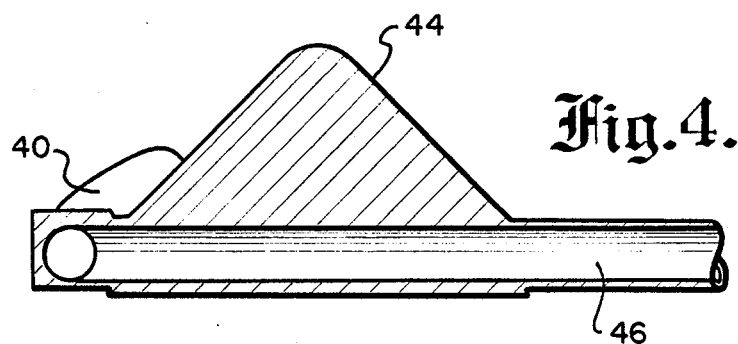
Fig.4.
Fig.5.
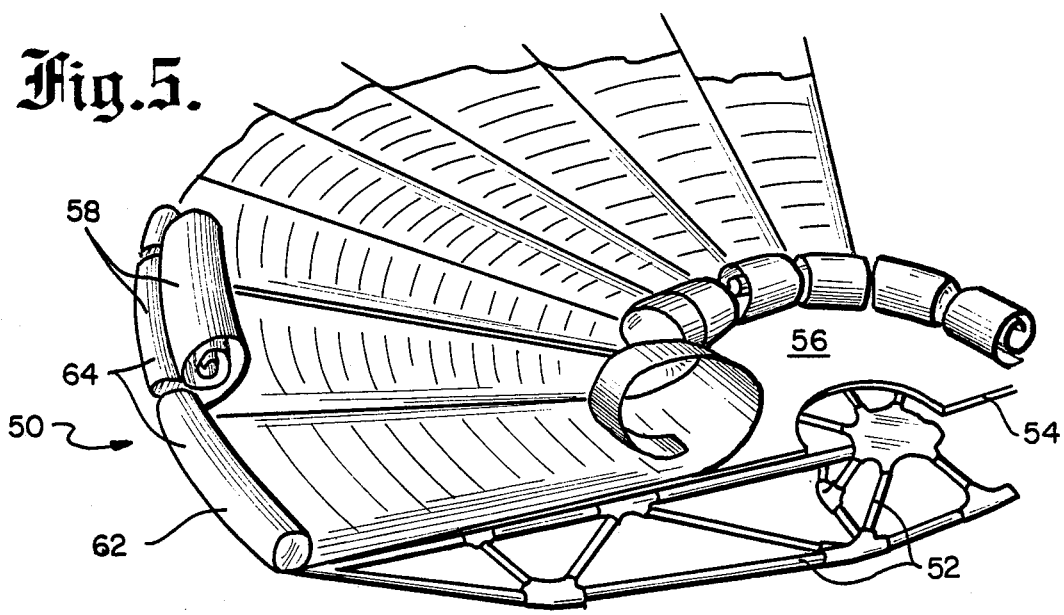

SOLAR ENERGY FOCUSING ASSEMBLY AND STORAGE UNIT

BACKGROUND OF THE INVENTION

1. Technical Field

The present invention relates generally to a solar-dynamic method for utilizing solar energy to supply power to a space station. More specifically, this invention is directed to a combined integrated solar absorber-thermal storage assembly and a solar energy focusing unit.

2. Background Art

Various solar radiation concentrators or collectors have previously been proposed to meet electrical power or propulsion requirements of spacecraft, satellites and the space station project. One such solar ray collector for use with a spacecraft utilizes posts extending respectively from apexes of a hexagon and collector subassemblies, each having a light receiving surface substantially identical in shape with the hexagon, as disclosed in U.S. Pat. No. 4,588,151, to Mori dated May 13, 1986.

A solar rocket absorber for use in outer space that heats a liquid by v solar energy and outputs the heated fluid to a thruster is disclosed in U.S. Pat. No. 4,528,978 to Robinson dated July 16, 1985.

Historically, thermal storage devices have utilized the same fluid for charging the thermal storage media up to a high temperature and for subsequently extracting the heat with the same fluid.

In contrast, the thermal storage assembly of the present invention charges the assembly by direct solar radiation and subsequently extracts the stored heat from the assembly utilizing a separate heat transfer fluid.

DISCLOSURE OF THE INVENTION

The present invention provides a solar energy focusing assembly and storage unit which may be utilized in functional cooperation with a space station power supply heat engine.

When a space station is in a typical low earth orbit, it passes through the shadow of the earth. During this shadowed period, the heat engine must be supplied with stored heat so that electrical output from the heat engine will not be interrupted.

The solar energy focusing assembly includes a reflective parabolic mirror and functional iris mirror surface cover assembly for concentrating and directing solar radiation to a thermal storage unit having dual fluid conduit systems configured to be selectively heated by incident solar radiation or passively by heat stored in the insulated body housing of the thermal storage unit. This assembly is thus capable of providing heated fluid to the space station heat engine at a continuous rate both during the in-sun and in-shadow time periods.

It is an object of the present invention to provide an integrated solar absorber-thermal storage assembly and a solar energy focusing unit.

Another object of the present invention is realized with a solar absorber-thermal storage assembly configured to provide thermal energy to a heated fluid powered heat engine.

Yet another object of the present invention is to provide a solar energy focusing unit in cooperative association with the solar absorber-thermal storage, the focusing unit having a unique iris mirror surface cover assembly.

These and other objects and features of the present invention will be apparent from the following detailed description when considered in connection with the accompanying drawings.

BRIEF DESCRIPTION OF THE DRAWINGS

FIG. 3 is a top view of the interior heat shield located within the storage unit.

FIG. 4 is a side view of the interior heat shield taken along line 3—3 of FIG. 3.

FIG. 5 is a partial schematic of the solar energy focusing assembly of the present invention.

DETAILED DESCRIPTION

Figure 1:
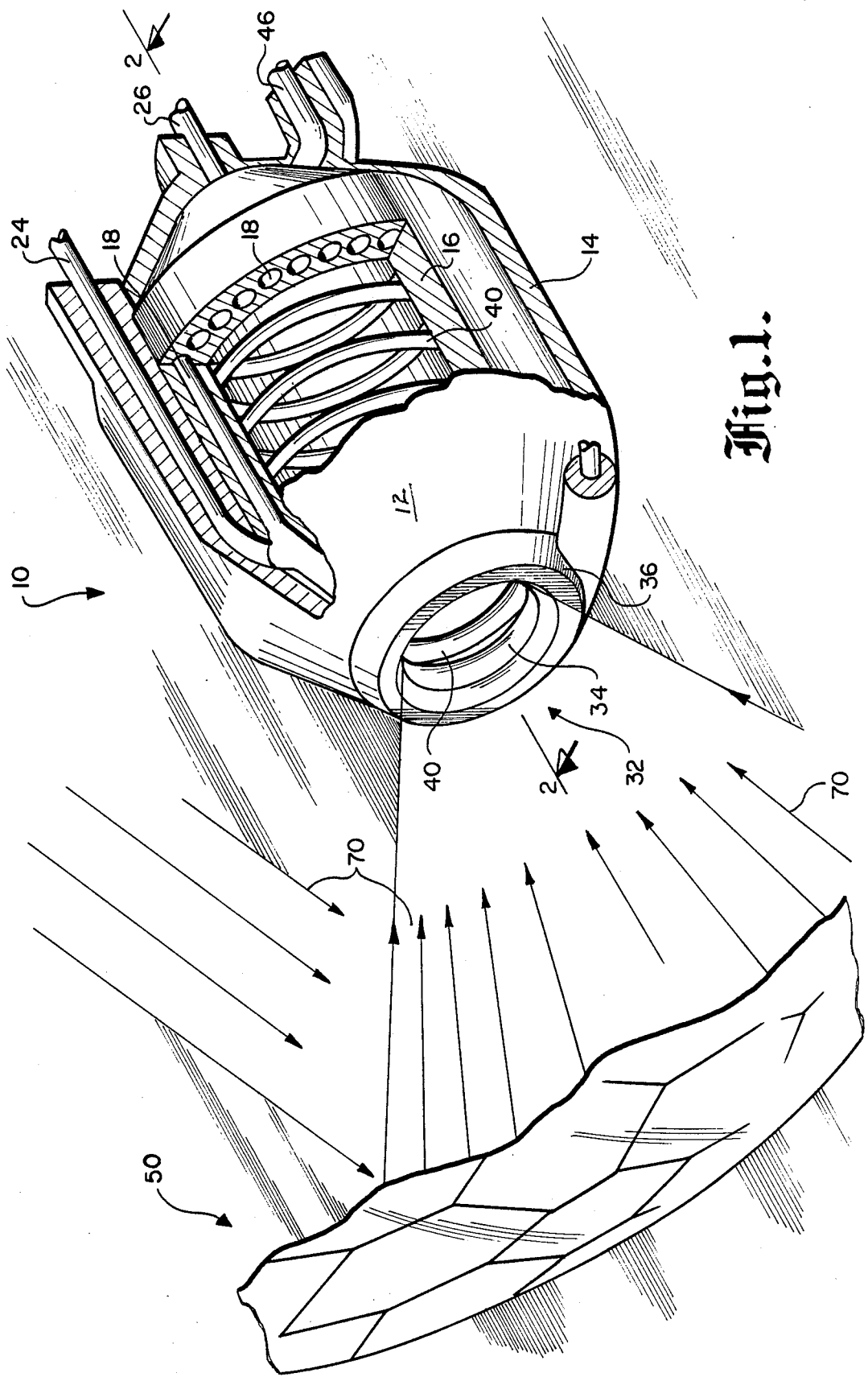
FIG. 1 is a perspective, partially schematic view of the combined solar energy focusing assembly and storage unit; a cutaway of the storage unit is provided to show internal details.

Referring now to the drawings and more particularly to FIG. 1, there is shown an integrated or combined solar absorber-thermal storage assembly and solar energy focusing unit 10 and 50, respectively. The focusing unit and storage assembly are aligned and integrally connected by a truss support structure (not shown). This allows the solar energy focusing unit to controllably direct solar energy to the solar energy absorber-thermal storage assembly.

Figure 2:
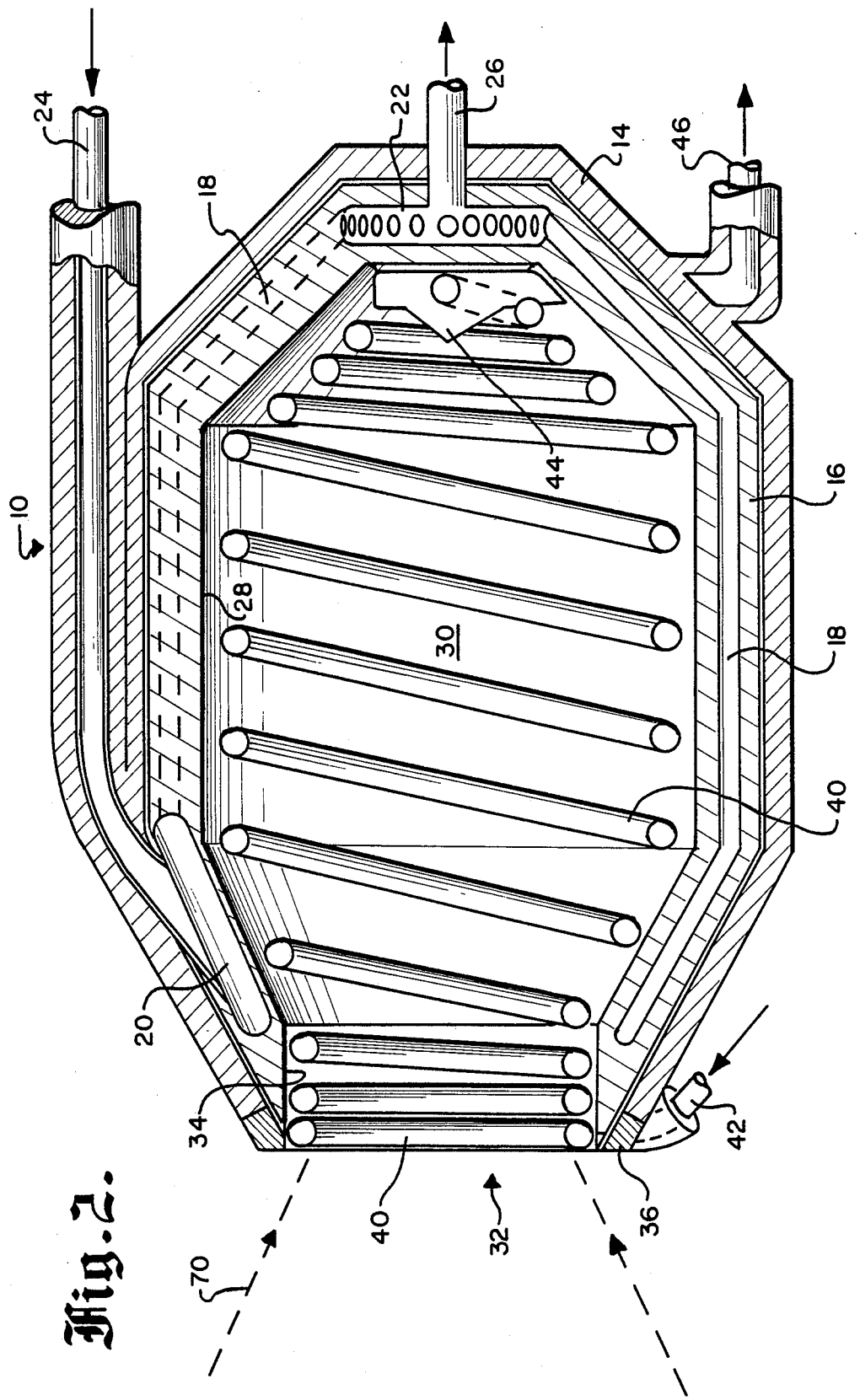
FIG. 2 is a cross section of the storage unit taken along line 2—2 of FIG. 1, detailing the dual fluid heating conduit arrangement.

As best seen in FIGS. 1 and 2, the solar energy absorber-thermal storage assembly 10 includes a housing 12 of generally oval configuration. The housing is provided with a high temperature multifoil layer of outer insulation 14. The outer multifoil insulation layer may be constructed of metals capable of taking a high polish such as nickel, aluminum, stainless steel, gold, silver and platinum or a combination of these metals. Primary consideration for metal selection is light weight and the ability to withstand the operating temperatures.

An inner thermal energy storage layer 16 is mated to the outer insulation layer 14 as by welding, pinning or bonding. The inner thermal energy storage layer is made of a metallic material, preferably beryllium or the salts thereof, which are capable of withstanding temperatures up to about 1300° C. This inner thermal storage material layer conforms to the generally oval shape of the outer insulation layer. Retained within the inner thermal storage material layer is a network of fluid conduits 18 positioned radially and circumferentially therein along the axial length of the housing 12.

The fluid conduit network is functionally associated with a circumferential inlet manifold 20 at which the network of fluid conduits connect and emanate, and a circular outlet manifold 22 at which the network of fluid conduits juncture and terminate.

The fluid conduit network 18, including the circumferential inlet manifold and circular outlet manifold, all positioned within the inner thermal energy storage layer, is also equipped with a fluid inlet 24 and fluid outlet 26 in functional association with the inlet manifold and outlet manifold respectively. The fluid conduit network including all the cofunctioning components may be constructed of thin-walled stainless steel, or nickel-base alloys such as Hastelloy (Trademark of Union Carbide Corporation) and refractory material such as niobium and zirconium.

The housing 12 of the storage assembly 10, and particularly the inner wall surface 28 of the inner thermal energy storage layer 16 defines an inner cavity 30. A solar radiation admitting circular aperture 32 is formed within one end of the housing opposite the fluid conduit network outlet manifold 22 and fluid outlet 26. Formed integrally with the housing at the terminus of the outer composite insulation layer and the inner thermal energy layer proximate the opening of the housing aperture 32 and rim 34 is a generally circular thermal insulation ring 36 made of, for example, aluminum oxide.

Referring now to FIG. 2, there is shown an independent helical-shaped fluid conduit assembly 40 contained and seated within the inner housing cavity. 30 and aperture opening rim 34. The coiled fluid conduit assembly may be made of the same material referred to above for the fluid conduit network 18 and associated structures located within the inner thermal storage material layer 16.

The helical-shaped fluid conduit assembly 40 contained within the inner cavity is constrained in its motion relative to the outer wall surface of the inner thermal energy storage layer at a multiplicity of select attachment points. The fluid conduit assembly 40 thereby forms a fluid conduit network having a tightly coiled configuration within the housing at the aperture and opposite end thereof, and spaced further apart thereinbetween to allow admitted solar energy to impinge not only on the helical-shaped fluid conduit assembly but also upon portions of the outer wall surface of the inner thermal energy storage layer.

The helical-shaped fluid conduit assembly 40 is also equipped with a fluid inlet 42 proximate the housing aperture 32 which connects to the assembly and a fluid outlet 46 at the end of the housing cavity opposite the aperture 32 (see FIGS. 1, 3 and 4). A conical terminus 44 acts as a heat shield to protect the juncture of the fluid conduit assembly 40 and fluid outlet 46 from exposure to direct solar radiation which impinges upon the conical terminus and outer wall surface of the inner thermal energy storage layer associated therewith.

Turning now to FIG. 5, the solar energy focusing unit 50 is shown in greater detail. The solar energy focusing unit includes a truss support structure 52, reflective parabolic mirror 54 and surface 56, and a functional iris mirror surface cover assembly 58 for selectively controlling the collection and concentration of solar radiation at the thermal storage assembly 10.

More particularly, the solar mirror surface iris cover assembly 58 comprises a multiplicity of flexible, impermeable functionally interconnected pie-shaped extensible and retractable inflatable wedges 60 and a gas manifold 62 divided into independent compartments 64, at the outermost perimeter of the mirror surface and interconnected to a gas delivery system (not shown) associated with the cover assembly. These flexible pie-shaped wedges forming the iris cover may be constructed of any suitable material having the desired flexibility, impermeability and capability of withstanding the rigors of the space environment. Materials suitable for the wedge construction would be polymers such as Myler (Trademark for film of polyethylene terephthalate—E. I. du Pont de Nemours & Co., Inc.) which has been precoated with a thin layer of aluminum, silver or gold metal.

A gas delivery system (not shown) is also provided by which air or other gases such as nitrogen or helium may be selectively introduced into the wedges 60 individually or concurrently through a control valve and manifold 62, with either gas or air being delivered to the control valve through a line from a compressor or pump. The gas or air may be controllably exhausted from wedges 60 individually or concurrently through an electrically operated discharge valve, typically of the solenoid type, which may be opened and closed by electrical signals. A sensor or sensors positioned so as to be engaged by the inflatable wedge segments are coupled to an automatic control monitor. This control monitor responds to actuation of a sensor and automatically energizes alternatively a pump or discharge valve to supply gas or discharge same from a wedge segment, as necessary to continuously optimize the surface area of the reflective mirror surface for concentrating collected solar radiation effectively and reliably at essentially a single focal point, the aperture of the solar absorber-thermal storage assembly.

In operation, a high temperature heat transfer fluid such as lithium, sodium or sodium potassium or a high temperature oil is utilized to transfer heat from the solar absorber to the heat engine during the in-sun time period and from the thermal storage layer of the solar absorber-thermal storage assembly to the heat engine during the in-shadow time period.

As the combined solar absorber-thermal storage assembly and solar energy focusing unit, which is positioned on the space station platform, emerges from the shadow of the earth, the parabolic reflective mirror surface concentrates and focuses solar radiation at the aperture of the solar absorber-thermal storage assembly housing. The solar radiation (indicated by arrows 70) enters the housing cavity where it impinges upon both the helical-shaped fluid conduit assembly and the wall surface 28 of the inner thermal storage layer 16 therein. During the in-sun period the helical-shaped fluid conduit assembly is selectively engaged, such as by appropriate valves, pumps and associated monitoring and control equipment.

The high temperature fluid within the helical-shaped fluid conduit assembly is heated by the solar radiation and channeled directly to fluid outlets which discharge into an expansion tank in a closed loop configuration coupled to a heat exchanger (not shown). The heat exchanger transfers the heat form the working fluid to a heat engine or prime mover such as a Brayton cycle. The heat depleted fluid is cycled back to the solar absorber and the process repeated.

Concurrently, while the helical-shaped fluid conduit assembly is in operation, a fraction of the sunlight passes between the helical turns of the helical-shaped fluid conduit assembly and strikes the outer wall surface of the solid beryllium inner thermal energy storage layer which absorbs heat from the solar radiation. The amount of heat absorbed by the beryllium is purposely varied along the outer wall surface by selectively varying the space between the coils of the helical-shaped fluid conduit assembly. In so doing, the temperature of the beryllium storage layer is raised to a high and approximately uniform level at the end of the in-sun period.

At the beginning of the in-shadow period, the working fluid within the helical-shaped fluid conduit assembly no longer receives heat from sunlight and that system is shut down by the associated monitoring and control equipment (not shown) with the concurrent rechanneling of fluid through the network of fluid conduits retained within the beryllium storage layer. This will cause a thermocline to occur and to travel from the housing aperture end at manifold 20 to the circular outlet manifold 22 at which the network of fluid conduits juncture and terminate. The geometry and thermal time constant of the inner thermal storage layer are selected such that the travel time of the thermocline approximately equals or exceeds the length of time the space station is in the shadow period.

The thermal storage material properties, geometry and the thermal and fluid dynamic properties of the liquid and rate of heat removal are all selected so that when the space station is reentering the in-sun phase of the orbit, the thermocline is at a prescribed position along the axial length of the storage layer.

The process described above is then repeated during each successive orbit.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In combination, an integrated solar absorber-thermal storage assembly and a solar energy focusing unit in which the storage assembly comprises:
   (a) a housing of a generally oval configuration comprising:
      (1) an outer composite insulation layer;
      (2) an inner thermal energy storage layer conforming to the configuration of the housing and outer insulation layer, said inner storage layer further comprising a network of fluid conduits retained within the inner thermal storage layer and positioned radially and circumferentially in conformity with the shape of the energy storage layer;
      (3) an inner cavity formed by an inner wall surface of the inner thermal energy storage layer;
      (4) a solar radiation admitting circular aperture formed within one end of the housing;
      (5) a shaped fluid conduit assembly contained within the inner cavity and aperture; and
   (b) the solar energy focusing unit includes a truss support structure, reflective parabolic mirrors and surfaces for focussing sun rays attached to said support structure, and a functional iris mirror surface cover assembly for covering said mirrors and surfaces comprising a multiplicity of flexible, impermeable functionally interconnected pie-shaped extensible and retractable inflatable wedges for selectively controlling the collection and concentration of solar radiation at the thermal storage assembly.

2. The combination of claim 1 in which the outer composite insulation layer comprises multi-foil metallic layers selected from the group of metals consisting of stainless steel, aluminum, gold, silver, platinum and nickel.

3. The combination of claim 1 in which the inner thermal energy storage layer further includes a circumferential inlet manifold at which the network of fluid conduits connect and emanate, a circular outlet manifold at which the network of fluid conduits juncture and terminate, and a fluid inlet and fluid outlet in functional association with the inlet manifold and outlet manifold, respectively.

4. The combination of claim 1 in which a generally circular thermal insulation ring is connected at the terminus of the outer composite insulation layer and the inner thermal energy storage layer proximate the opening of the housing aperture.

5. The combination of claim 1 in which the shaped fluid conduit assembly includes a multiplicity of select attachment points within the housing cavity which form a fluid conduit network having a tightly coiled configuration within the housing at the aperture and opposite end thereof, and spaced further apart thereinbetween to allow admitted solar energy to impinge not only on the shaped fluid conduit assembly but also upon the inner wall surface of the inner thermal energy storage layer.

6. The combination of claim 5 in which the shaped fluid conduit assembly further includes a fluid conduit terminus interconnected to a fluid outlet at the end of the housing cavity opposite the aperture, and a shaped fluid conduit assembly fluid inlet at the aperture end of the housing.

* * * * *